INVENTORS
Emil J. Grichnik
Attorney

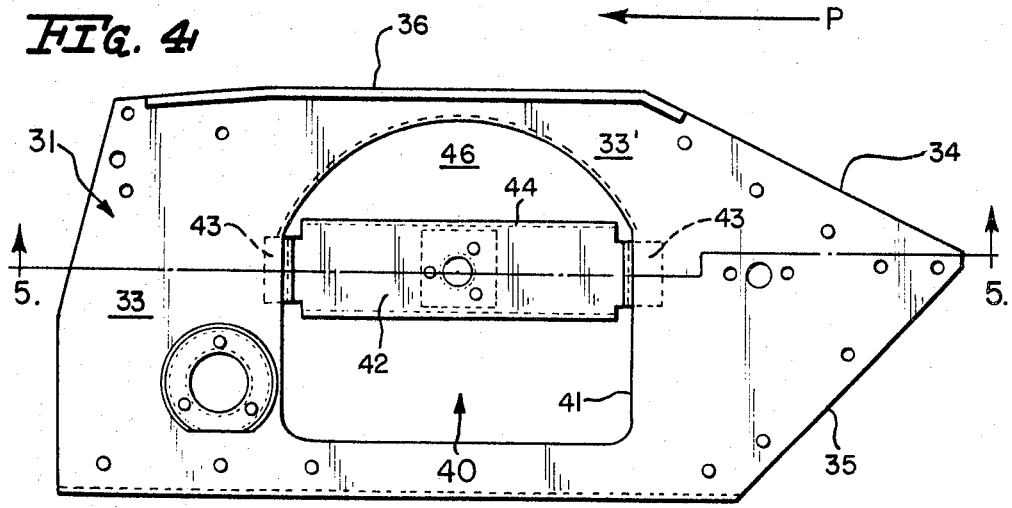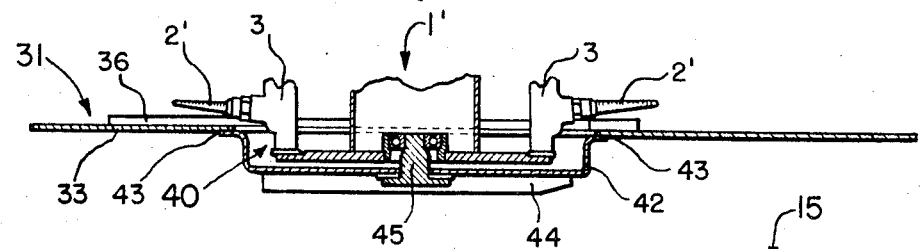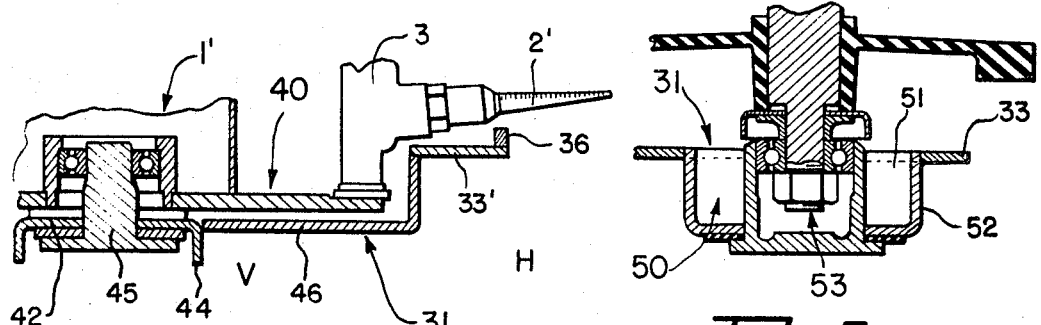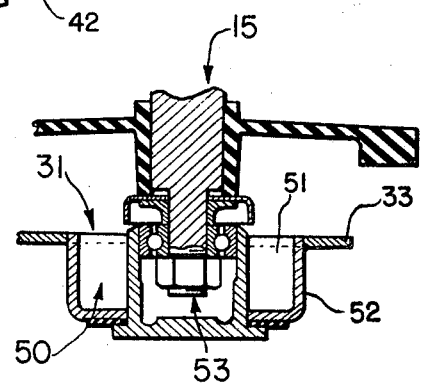

United States Patent Office 3,451,201
Patented June 24, 1969

3,451,201
COTTON PICKER HOUSING STRUCTURE
Emil J. Grichnik, Memphis, Tenn., assignor to International Harvester Company, a corporation of Delaware
Filed Aug. 12, 1965, Ser. No. 479,117
Int. Cl. A01d 45/18
U.S. Cl. 56—44                 3 Claims

ABSTRACT OF THE DISCLOSURE

A cotton harvester having picker drums with rotatable picking spindles vertically mounted thereon, said drum mounted in a housing having a lower recessed portion receiving the lower portion of said picker drum to position said drum to pick cotton from the lowermost portion of the cotton plants, the recessed portion being partially enclosed defining a shielding facing the plants and opening facing the furrow to permit egress of trash accumulated therein, the recessed portion having therebeneath downwardly extending runners disposed substantially parallel to the direction of traverse to provide adequate ground clearances for said housing during picking operations.

---

This invention relates to cotton harvesters of the picker type, and more particularly relates to an improved housing structure therefor.

Cotton harvesters of the type wherein rotating picking spindles are mounted on a picking drum or rotor, such as generally shown in U.S. Patent 3,169,359, have been highly successful. However, in accordance with this invention, it has been found that the yield and efficiency of such harvesters can be significantly increased by providing the harvester with a housing structure which lowers the picking drum and associated picking components and permits the picking spindles to collect cotton from the lowermost portion of the cotton plant.

It is thus the principal object of this invention to provide a novel drum housing for a cotton harvester which improves the picking efficiency and yield of the harvester.

It is a further object of this invention to improve the picking efficiency and yield of a cotton harvester by providing the harvester with a drum housing which lowers the picking drum and spindles and permits the spindles to collect cotton from the lowermost portion of the cotton plants.

It is a still further object of this invention to provide a cotton harvester with a housing structure which lowers the picking drum and spindles without materially altering the structural or operating characteristics of the cotton harvester components, and which provides a guard structure to shield the lower harvester components from the ground while maintaining the necessary clearance between the ground and the housing.

More specific objects and features of this invention will become apparent by reference to a specific embodiment thereof, as illustrated in the accompanying drawings. In these drawings:

FIGURE 4 is an enlarged horizontal view of the base support of the improved housing structure, as illustrated in FIGURE 3, with the picking drum and associated parts omitted for clarity;

FIGURE 5 is a vertical sectional view of the base support taken along line 5—5 in FIGURE 4, shown with the picking drum and associated picking spindles mounted thereon;

FIGURE 6 is an enlarged horizontal sectional view taken along the line 6—6 in FIGURE 3; and FIGURE 7 is a horizontal sectional view taken along the line 7—7 in FIGURE 3 illustrating the lowered mounting for the harvester doffer provided by the housing structure in accordance with this invention.

Figure 1:
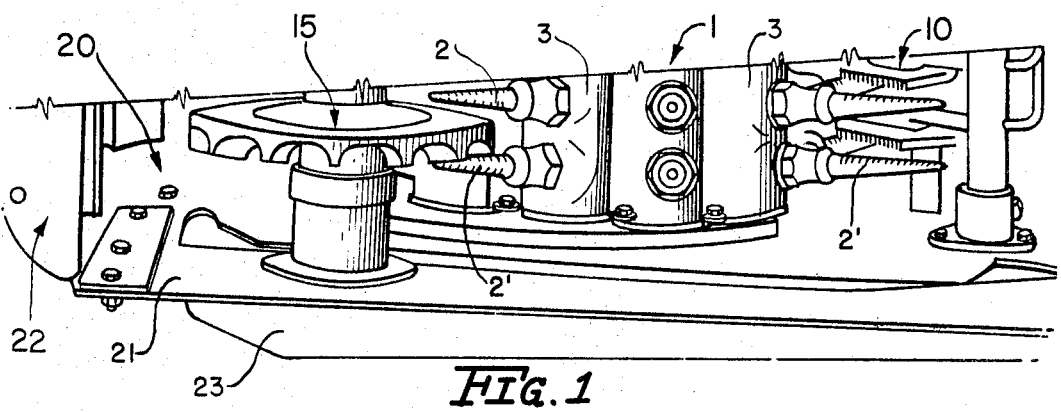
FIGURE 1 is an enlarged perspective view of the drum housing structure of a prior art cotton harvester.
Figure 3:
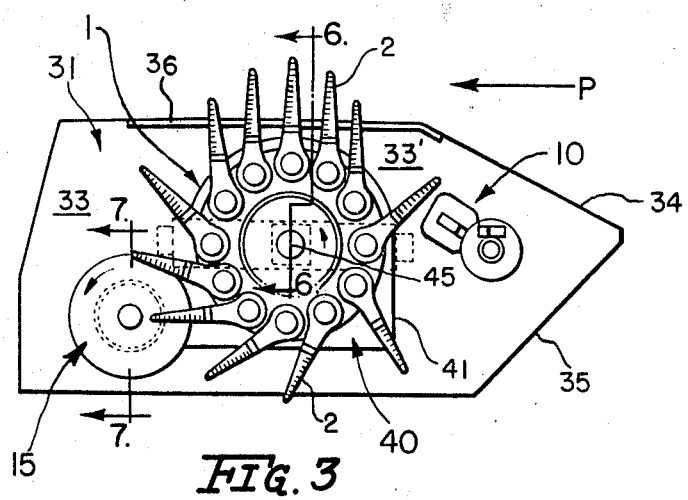
FIGURE 3 is a horizontal view of the improved housing structure as shown generally in FIGURE 2 and illustrated in smaller scale.

Referring initially to the prior art harvester as illustrated in FIGURE 1, the type of harvester under consideration generally includes a picking rotor or drum 1 positioned on the harvester in a drum housing 20 adjacent to a longitudinal plant passage defined between the inner side of the drum housing and opposing harvester components. This logitudinal plant passage, through which a row of earthborne cotton plants pass as a result of the movement of the harvester along a cotton field, is generally indicated as P in FIGURES 3 and 4. Drum 1 is provided with a series of vertically spaced picking spindles 2 extending transversely outward from the drum, and as more fully illustrated and described in U.S. Patents 2,821,832 and 3,169,359, these picking spindles 2 are mounted upon vertical carrying bars 3 positioned around the periphery of the picking drum 1, and the drum 1 and the carrying bars 3 include suitable mechanisms, not shown, which rotate the drum 1 about a substantially vertical axis, and rotate the spindles 2 about their individual spindle axes in generally horizontal plane. The spindles 2 on this type of harvester are further operably connected to the picking drum 1 for movement within the plant passage P, as shown in FIGURE 3, into picking relationship with the bolls of earthborne cotton plants being harvested by this ambulatory cotton harvester.

As further illustrated in the prior art harvester of FIGURE 1, the cotton harvesters of the type under consideration also generally include a moistening device 10, to moisten the picking spindles 2 during the harvesting operation, and a suitable doffer mechanism 15 to remove the cotton collected on the spindles 2.

In these cotton harvesters, as above-described, the harvester drum housing 20 has heretofore supported the drum 1 and other associated components in a substantially raised position in relation to the plants being harvested in order to maintain the necessary ground clearance for the housing between the rows of cotton. As illustrated in FIGURE 1, the picking drum 1, moistening device 10 and doffer mechanism 15 are supported within such prior drum housings by a flat base plate 21 positioned on the harvester by suitable vertical support structure 22. These prior drum housings 20 were also usually provided with a lower runner 23 to protect the housing from damage by rocks or the like encountered in the cotton field. The connection of the drum 1 to this flat base plate 21 did not permit the lower picking spindles 2' of the drum 1 to engage with the bolls on the lowermost portion of the cotton plants being harvested, and thus prevented the collection of cotton from the entire length of the cotton plant. The efficiency and yield of the harvester was thus limited by this relatively high positioning of the harvester picking components.

In accordance with this invention, the cotton harvester of the type under consideration is provided with an improved drum housing structure which mounts the picking drum 1 and its associated components in a lower position on the harvester than heretofore possible, and permits the lower picking spindles 2' to collect cotton from the lowermost portion of the cotton plant so that the entire plant is harvested.

Figure 2:
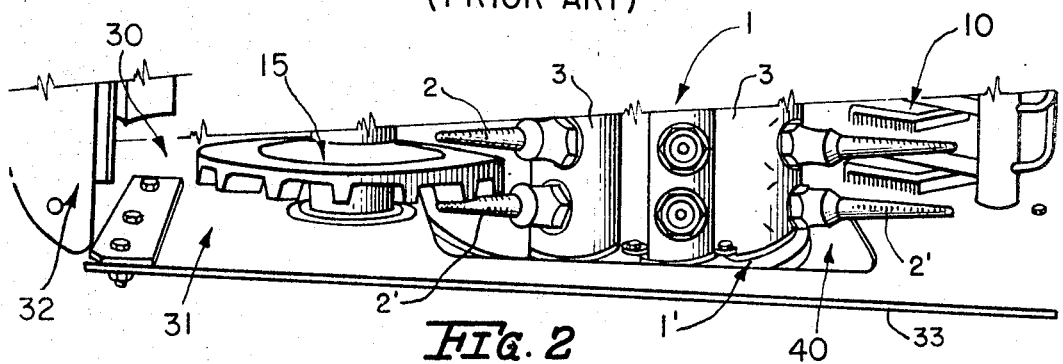
FIGURE 2 is an enlarged perspective view of the improved drum housing structure for a cotton harvester in accordance with this invention.

As shown in FIGURE 2, this improved drum housing structure, generally indicated by the reference numeral 30, includes a base support 31 connected to the harvester by vertical support structure 32. FIGURES 3 and 4 illustrate that this base support 31 is mounted on the harvester adjacent to the plant passage P, and includes a substantially flat plate 33 having leading angled edges 34 and 35, on its inner and outer sides respectively. The angled edges 34 and 35 allow the housing 30 to move freely through the cotton plants in the field, and in addition, the inner portion 33' of this flat plat adjacent to plant to guide the cotton plants into the plant passage. This substantially flat plate 33 of the drum housing further includes an upwardly-turned guard rail 36 positioned along the inner portion 33 of this flat plate adjacent to plant passage P, as shown in FIGURE 4, which assists in shielding the picking components of the harvester from the ground, and protects the harvester from damage during the harvesting operation.

In order to mount the picking drum 1 in a lower position on the harvester, this base support 31 of the drum housing 30 is provided with a centrally-disposed recess 40 extended below the flat plate 33. In this embodiment, this recess 40 is formed by providing an aperture 41 in the flat plate 33 of sufficient size to receive the lower end 1' of the picking drum 1, and by extending a lower drum support member 42 beneath the aperture 41, as clearly shown in FIGURE 5. Member 42 is securely connected to the flat plate 33, such as by welds 43, and includes suitable means, such as a mounting pin 45, to rotatably mount the picking drum 1 within the recess 40 so that the drum 1 is rotatable within the recess about a substantially vertical axis. This mounting pin 45 and the member 42 are further arranged so that the lower picking spindles 2' on the drum are operably movable over the flat plate 33 and guard rail 36 into the plant passage P for engagement with the bolls on the lowermost portion of the cotton plants.

As seen from FIGURE 6, this lower drum support member 42 is positioned below the central portion of flat plate 33 so that it extends downwardly from the drum housing into the valley V between the cultivated plants hills H in the cotton field when the inner portion 33' of the flat plate 33 extends over the plant hill. The lower drum support member 42 may also be provided with downturned runners 44 to guard the drum housing from rocks or the like encountered in the field, and a cover plate 46 can be extended beneath aperture 41 to at least partially enclose the recess 40 and shield the picking drum 1 from damage by dirt or other foreign matter during the harvesting operation.

As seen from FIGURE 6, the inner portion 33' of the flat plate 33, the cover plate 46, and the lower drum support member 42 therefore provide the drum housing with a base support 31 for the drum 1 having a downwardly stepped inner side which permits the drum to be mounted in a low position on the harvester and which shields the drum from damage while still providing the necessary ground clearance for the drum housing between the cotton rows in the field being harvested. By this arrangement, the lowermost portion of the cotton plants can be harvested by the lower spindles 2' on the drum 1, as illustrated in FIGURE 6, and the yield and efficiency of the cotton harvester is improved without any alteration in the structure or operation of the picking components of the type of harvester under consideration.

Also in accordance with this invention, FIGURE 2 shows that the associated spindle moistening device 10 and the doffer mechanism 15 in this harvester are mounted in a lower position on the drum housing 30 to maintain their proper operative relationship with the picking spindles 2. As shown in FIGURE 7, this lowering of the doffer mechanism 15 may be accomplished by providing a second recess 50 in the base support 31 of the drum housing. This recess 50 as illustrated is defined by the aperture 51 in the flat plate 33 and by the support member 52 connected to the flat plate below the aperture 51. Support member 52 is preferably cup-shaped to substantially enclose recess 50 and shield the doffer mechanism 15 from damage, and includes a journal assembly 53 to mount the doffer mechanism for rotation within the recess in a low position on the housing. The lower end of the spindle moistening mechanism may be similarly mounted within an enclosed recess in a low position on the drum housing.

The foregoing is merely illustrative of an embodiment of the improved drum housing structure in accordance with this invention. It should be understood that various modifications in the structural and functional features of this housing may be devised by those skilled in the art without departing from the scope of this invention, as set forth in the accompanying claims.

What is claimed is:
1. In an ambulatory cotton harvester comprising a housing having a plant passage to successively receive earth born cotton plants therethrough, a vertical cotton picking rotor within the housing having upper and lower end portions and orbital about a generally vertical axis, said rotor comprising vertically spaced transversely extending banks of spindles operable for movement into the passage in picking association with cotton on the plants therein and withdrawing the cotton on the spindles into the housing, said housing having a bottom wall with an opening therein receiving the lower end portion of the rotor, a support connected to said bottom wall and offset therebelow and subdividing said opening into two portions, one portion being disposed adjacent to said passage and the other portion being remote from the passage, a shield connected to said bottom wall and positioned below the lowermost bank of spindles and adapted to support cotton thereon within reach of said lowermost bank of spindles and covering said one portion adjacent to the passage to prevent entry of dirt and the like into the housing from therebelow, said remote portion of the opening being open to permit egress of trash from the housing downwardly therethrough.

2. The invention according to claim 1, and said support including downwardly extending runners to provide ground clearance during harvesting.

3. The invention according to claim 1, and a guard rail adjacent the plant passage extending upwardly from the bottom wall.

References Cited

UNITED STATES PATENTS

| | | | |
|---|---|---|---|
| 853,916 | 5/1907 | Campbell | 56—43 |
| 2,293,495 | 8/1942 | Dicks | 56—41 |
| 2,635,409 | 4/1953 | Thomann | 56—44 |
| 2,821,832 | 2/1958 | Morkoski | 56—44 |
| 3,314,221 | 4/1967 | Forbes | 56—44 |

ANTONIO F. GUIDA, *Primary Examiner.*

PASQUALE A. RAZZANO, *Assistant Examiner.*